United States Patent
Piccioni

(10) Patent No.: US 12,082,739 B2
(45) Date of Patent: Sep. 10, 2024

(54) HERMETIC CONTAINER FOR FOOD WITH AUTOMATIC VALVE FOR DISCHARGING THE STEAM PRODUCED BY HEATING THE FOOD, IN PARTICULAR IN A MICROWAVE OVEN, AND RELATIVE AUTOMATIC STEAM DISCHARGE VALVE

(71) Applicant: VETRERIA DI BORGONOVO SPA, Milan (IT)

(72) Inventor: Pier Francesco Piccioni, Milan (IT)

(73) Assignee: VETRERIA DI BORGONOVO SPA, Milan (IT)

( * ) Notice: Subject to any disclaimer, the term of this patent is extended or adjusted under 35 U.S.C. 154(b) by 115 days.

(21) Appl. No.: 17/789,613

(22) PCT Filed: Dec. 30, 2020

(86) PCT No.: PCT/IT2020/050329
§ 371 (c)(1),
(2) Date: Jun. 28, 2022

(87) PCT Pub. No.: WO2021/137265
PCT Pub. Date: Jul. 8, 2021

(65) Prior Publication Data
US 2023/0038511 A1    Feb. 9, 2023

(30) Foreign Application Priority Data
Dec. 31, 2019   (IT) .......................... 102019000025867

(51) Int. Cl.
*A47J 36/38*    (2006.01)
*A47J 36/02*    (2006.01)
(Continued)

(52) U.S. Cl.
CPC ............. *A47J 36/38* (2013.01); *A47J 36/027* (2013.01); *B65D 51/1655* (2013.01); *F16K 15/033* (2013.01)

(58) Field of Classification Search
CPC ..... A47J 36/38; A47J 36/027; B65D 51/1655; B65D 45/20; B65D 51/1683; B65D 2205/00; B65D 81/3453; F16K 15/033
See application file for complete search history.

(56) References Cited

U.S. PATENT DOCUMENTS 4,796,776 A * 1/1989 Dalquist ................. A47J 27/09
                                                              220/203.02
5,363,978 A    11/1994 Molo
(Continued)

FOREIGN PATENT DOCUMENTS

JP    2012-192081    10/2012
KR    10-1409033    6/2014
(Continued)

OTHER PUBLICATIONS

International Search Report for PCT/IT2020/050329, mailed Apr. 21, 2021, 4 pages.
(Continued)

*Primary Examiner* — Kareen K Thomas
(74) *Attorney, Agent, or Firm* — NIXON & VANDERHYE

(57) ABSTRACT

A container for heating and cooking food includes: a lower containment body; an upper cover hermetically coupling with the lower containment body; and an automatic valve, in the shape of a cap, integrated in the upper cover, allowing steam to vent. The automatic venting valve includes: a control member controlling the pressure inside the container; and an elastic tongue associated and moulded in one piece with the control member. The control member is housed and rotatable in a recess in the upper cover. The (Continued)

elastic tongue has a deformed configuration, applying an elastic force pressing and closing the control member against a through hole in the bottom of the recess housing the control member, preventing the steam from exiting the container. When the steam pressure reaches a critical value, the control member rotates and tilts, removing the control member from the through hole, allowing the steam to vent.

18 Claims, 6 Drawing Sheets

(51) Int. Cl.
*B65D 51/16* (2006.01)
*F16K 15/03* (2006.01)

(56) References Cited

U.S. PATENT DOCUMENTS

| | | | |
|---|---|---|---|
| 5,806,703 A | 9/1998 | Grandi | |
| 6,959,831 B2* | 11/2005 | Maslowski | B65D 45/34 |
| | | | 220/320 |
| 6,997,313 B2* | 2/2006 | Rigling | A61M 5/3205 |
| | | | 206/370 |
| 8,623,289 B2* | 1/2014 | Cesa | A61B 50/30 |
| | | | 292/307 R |
| 9,649,399 B2* | 5/2017 | Weisshaupt | A61L 2/26 |
| 2003/0019878 A1* | 1/2003 | Scarabelli | B65D 51/1666 |
| | | | 220/366.1 |
| 2003/0170359 A1* | 9/2003 | Garwood | B65D 81/28 |
| | | | 426/392 |
| 2003/0185948 A1* | 10/2003 | Garwood | A23L 13/00 |
| | | | 426/392 |
| 2006/0147588 A1* | 7/2006 | Garwood | A23L 3/3418 |
| | | | 426/392 |
| 2008/0317912 A1* | 12/2008 | Keller | B65B 31/08 |
| | | | 426/234 |
| 2013/0042765 A1* | 2/2013 | Chameroy | F16J 15/064 |
| | | | 99/324 |
| 2014/0311361 A1* | 10/2014 | Wangler | A47J 47/005 |
| | | | 99/467 |
| 2016/0360920 A1* | 12/2016 | Park | H05B 6/6494 |
| 2023/0038511 A1* | 2/2023 | Piccioni | A47J 36/027 |

FOREIGN PATENT DOCUMENTS

| | | |
|---|---|---|
| WO | 2005/054064 | 6/2005 |
| WO | 2006/084402 | 8/2006 |

OTHER PUBLICATIONS

Written Opinion of the ISA for PCT/IT2020/050329, mailed Apr. 21, 2021, 5 pages.

* cited by examiner

US 12,082,739 B2

HERMETIC CONTAINER FOR FOOD WITH AUTOMATIC VALVE FOR DISCHARGING THE STEAM PRODUCED BY HEATING THE FOOD, IN PARTICULAR IN A MICROWAVE OVEN, AND RELATIVE AUTOMATIC STEAM DISCHARGE VALVE

This application is the U.S. national phase of International Application No. PCT/IT2020/050329 filed Dec. 30, 2020 which designated the U.S. and claims priority to IT 102019000025867 filed Dec. 31, 2019, the entire contents of each of which are hereby incorporated by reference.

TECHNICAL FIELD OF THE INVENTION

The present invention relates in general to the field of containers suitable for containing food and in general food products intended to be heated and cooked, and more particularly it relates to a new and innovative hermetic or airtight container, typically of glass, having an upper lid or cover which integrates an automatic, plug-shaped valve for venting and discharging, outside the container, the steam or vapour which is produced, inside the same airtight container, by heating and cooking the food and food product, usually but not exclusively in a microwave oven.

The present invention also relates to a corresponding new and innovative valve device, in the form of a plug, adapted to be advantageously integrated in a hermetic container, typically in the respective cover, provided to contain food and generally food products intended to be heated and cooked, in particular, in a microwave oven, wherein this valve device has the capability to automatically discharge and vent, to the outside of the container, the steam which is produced inside the same container by heating and cooking the food and the food product.

BACKGROUND OF THE INVENTION AND STATE OF THE ART

In the field of hermetic containers provided for containing food to be heated and cooked, in particular in a microwave oven, the prior art and the actual market offer numerous solutions aimed at allowing steam, which is usually produced inside the airtight container due to the heating of the food in the microwave oven, to be displaced and to be discharged outside the container.

In this way, it is avoided that high pressures are reached inside the same container which could both compromise correct cooking of the food and be critical and dangerous for the user of the container and of the microwave oven.

In this regard, there is cited patent document EP 1 464 262 B1 which describes a container, for heating food in a microwave oven, comprising a cap housed in a recess formed in a lid of the container, wherein the cap is adapted to move axially upward and downward with respect to the lid within a range limited by grooves and steps formed in the recess and cap, in order to allow the escape of the steam generated inside the container due to the heating of the food, when the cap moves upwards due to the pressure of the steam.

However the configuration of this cap, movable upwards and downwards, similar to a valve device able to intervene automatically to allow the steam to vent when it reaches a critical pressure inside the container, appears to be rather complex and furthermore to require an extremely precise construction of its parts, with a consequent manufacturing cost which is not negligible, if it is to be ensured a correct operation of this steam venting cap.

Other solutions and embodiments, however also affected by limits and drawbacks, of containers for use in heating food, in particular in a microwave oven, with these containers having a steam discharge valve for discharging the steam which is generated inside the container by heating the food in the microwave oven, are also known from the following patent documents: U.S. Pat. No. 5,750,967; CN 292063371; U.S. Pat. Nos. 6,035,769; 4,557,396.

Furthermore in the field of so-called "pressure pots", valve systems and devices are also known, integrated in the lid of these pots, which automatically operate for safety reasons, so as to allow the steam generated inside the pot to freely flow out. when the vapour pressure reaches a critical threshold.

However also these known valve systems and devices, usually comprising a mass whose weight must be overcome by the pressure of the steam present inside the pot so as to move the mass upwards, appear to be rather bulky and consequently unsuitable to be integrated in the lid of a container which is provided to contain food to be heated in a microwave oven and therefore requires a compact size and dimensions compatible with those of the compartment of a usual microwave oven.

Moreover, often, the valve devices, offered by the prior art, able to allow the free venting of the steam generated inside a container provided to contain food to be heated in a microwave oven, upon reaching a critical pressure inside the same container, have the considerable drawback that these valve devices do not have an automatic operation, but they must be activated manually by a user, in order to be not passive and therefore be adapted to operate correctly to allow, if necessary, steam or vapour to flow out of the container.

it follows that if the user does not remember to manually activate these valve devices, when using the respective container for heating food in a microwave oven, there is a risk that the pressure of the steam generated inside the container may reach critical values. considerably higher than those which are necessary to heat and cook the food and at the limit also potentially dangerous for the user of the microwave oven.

OBJECT AND SUMMARY OF THE INVENTION

It is therefore a first object of the present invention to provide a new container, for use in containing food and in general food products to be heated and cooked in particular in a microwave oven, comprising an automatic valve for venting and discharging to the outside the vapour or steam which is usually produced by heating and cooking, in the microwave oven, of the food contained in the same container, wherein the automatic valve, included in the container, is such as to have a safe operation, fast and effective, so as to ensure correct and regular cooking in the microwave oven of the food and food contained in the container, and moreover allows to remedy the drawback that the user must remember to open or close the steam venting valve, as it is often necessary for microwave oven containers and similar food cooking and heating systems, currently used in the market.

A second object of the present invention is also to propose and provide a container for containing food and generally food products intended to be heated and cooked, in particular in a microwave oven, comprising an automatic valve, for venting and discharging at the outside the steam generated inside the container due to heating of the food contained therein, wherein such automatic valve, included in and essential part of the container, involves a limited encumbrance, compatible with the configuration and dimensions of the containers provided for being introduced into the compartment of a microwave oven, as well as a low manufacturing cost.

A further object of the present invention is also to propose a new and innovative valve device, in the form of a plug or a cap, which can be integrated in an airtight or hermetic container for heating and cooking food, in particular in a microwave oven, designed to allow the automatic venting and discharge of the steam produced inside the container by the heating and cooking of the food contained therein, wherein this valve device has a safe and effective operation and a limited manufacturing cost.

The above objects can be considered fully achieved by the hermetic container, for heating and cooking food and food products, in particular in a microwave oven, which has the characteristics recited by the independent main claim 1, and by the respective automatic valve device or valve, designed to allow the automatic venting and discharge of the steam which is produced by the heating and cooking of the food and food product contained in the container, having the characteristics recited by the independent claim 7.

Particular embodiments of the container for food and food products, according to the present invention, and of the respective valve device for venting and discharging the steam produced inside the container by heating and cooking the food, are further defined by the dependent claims.

Advantages of the Invention

As it will become clear from the following description, both the new hermetic container for containing food and food products to be heated, in particular in a microwave oven, and the respective valve device for the automatic venting of the steam which is generated inside the container due to the heating of the food, offer a series of relevant and unique advantages, some of which have already been previously illustrated, among which the following ones are mentioned purely by way of example:
  effective and precise control of the pressure inside the hermetic container, so as to ensure correct heating and optimum cooking, in the microwave oven, of the food and food product contained in the hermetic container itself;
  great safety and reliability in the use of the container, since the drawback is avoided, which often affects the containers offered on the market, that the user forgets to activate the valve device for venting outside the steam generated inside the container due to the heating of the food contained therein;
  a configuration of the valve device, for the automatic steam venting, compact and easy to manufacture, as also suitable to be integrated in the lid of a container for heating food and food products in a microwave oven;
  reliable and safe operation of the valve device, with performances not subjected to degradation over time;
  a configuration of the valve device characterized by a limited number of parts, which can be manufactured at an industrial level by moulding a plastic material, so as to imply a respective reduced manufacturing cost.

BRIEF DESCRIPTION OF THE DRAWINGS

These and other objects, features and advantages of the present invention will become clear and apparent from the following description of some preferred embodiments and applications thereof, provided purely by way of non-limiting example with reference to the attached drawings, in which.

DESCRIPTION OF A PREFERRED EMBODIMENT OF THE CONTAINER FOR FOOD AND FOOD PRODUCTS AND OF THE RESPECTIVE AUTOMATIC VALVE, FOR VENTING THE STEAM PRODUCED BY HEATING THE FOOD CONTAINED IN THE SAME CONTAINER, ACCORDING TO THE INVENTION

With reference to the drawings, a container, according to the present invention, suitable for containing food and generally food products to be heated and cooked, in particular but not exclusively in a microwave oven, is generally indicated with 10.

Figure 1:
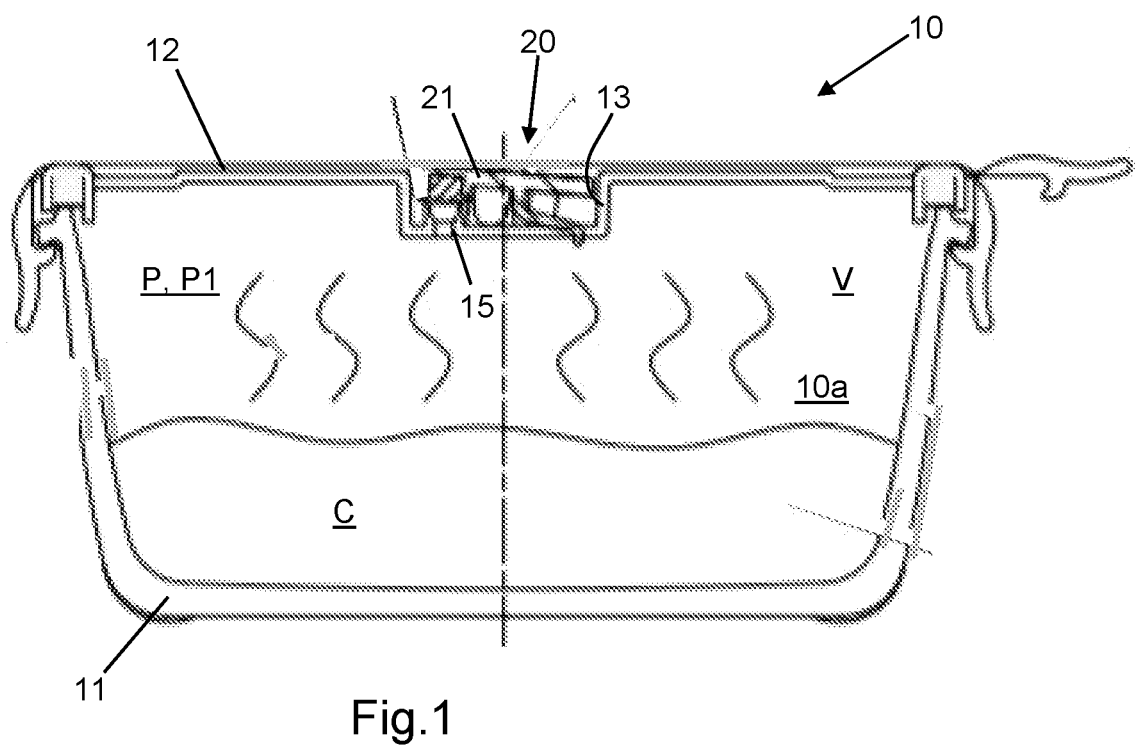
FIG. 1 is a schematic sectional view of a container, according to the present invention, containing food or more generally a food product to be heated, in particular but not exclusively, in a microwave oven.
Figure 2:
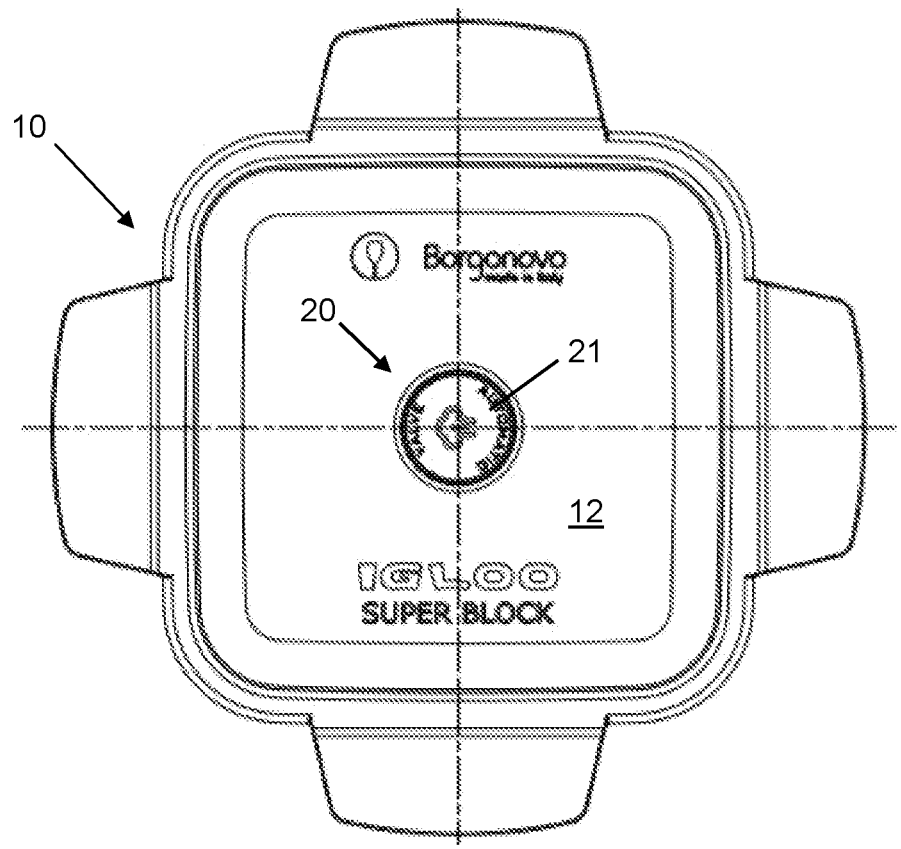
FIG. 2 is a schematic plan view of the container for food and food products of FIG. 1.
Figure 3:
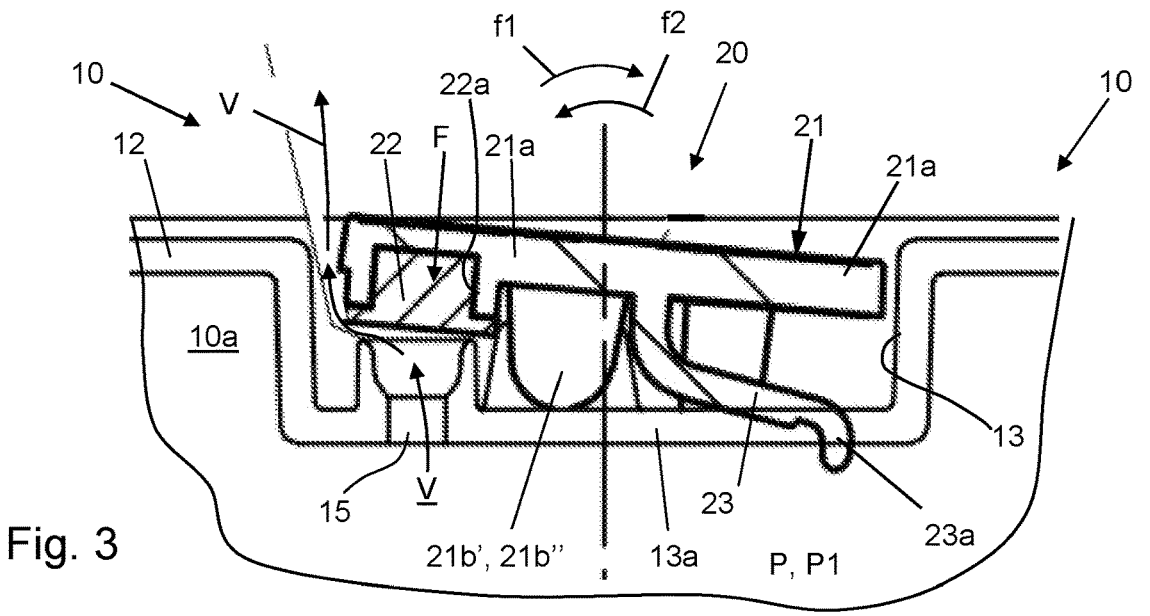
FIG. 3 is a schematic sectional view, on an enlarged scale, of an automatic valve, integrated in an upper lid of the container of FIGS. 1 and 2, adapted to allow the steam which forms inside the same container to vent as a result of the heating of the food and the food product, in particular in the microwave oven.
Figure 4:
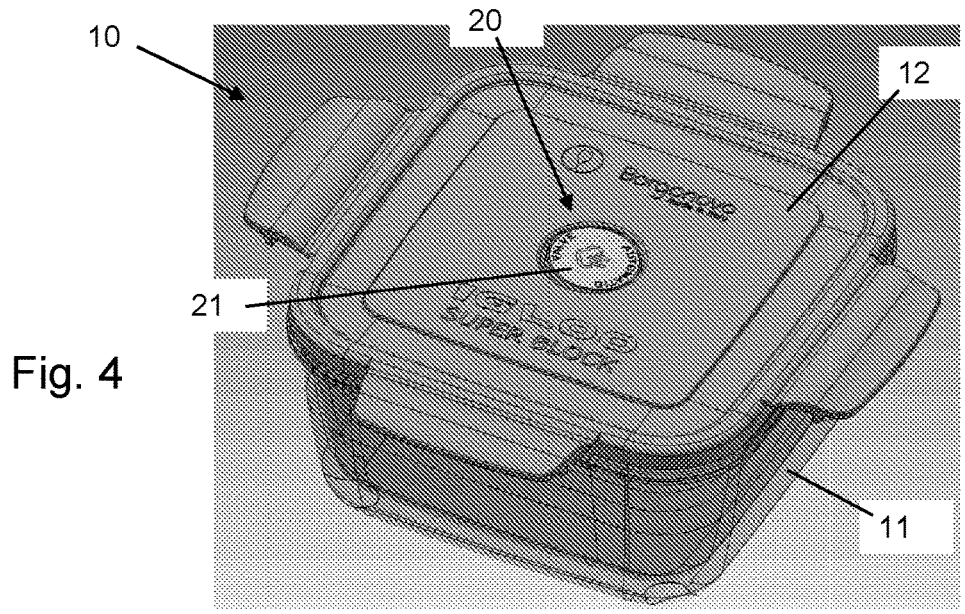
FIGS. 4, 5, 6, 7 are three-dimensional and sectional graphical views of the container of the invention and of the respective automatic steam venting valve, which integrate the views of FIGS. 1-3.
Figure 5:
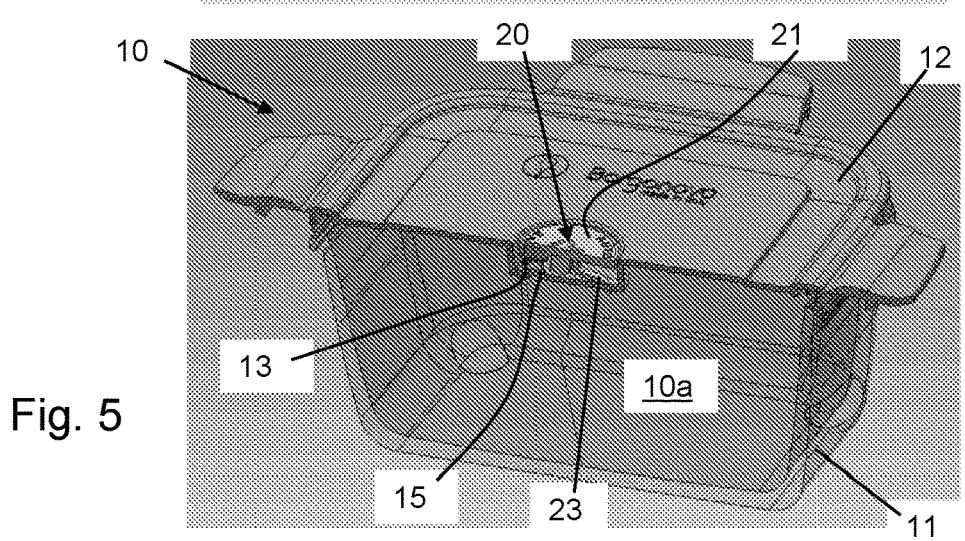
Figure 6:
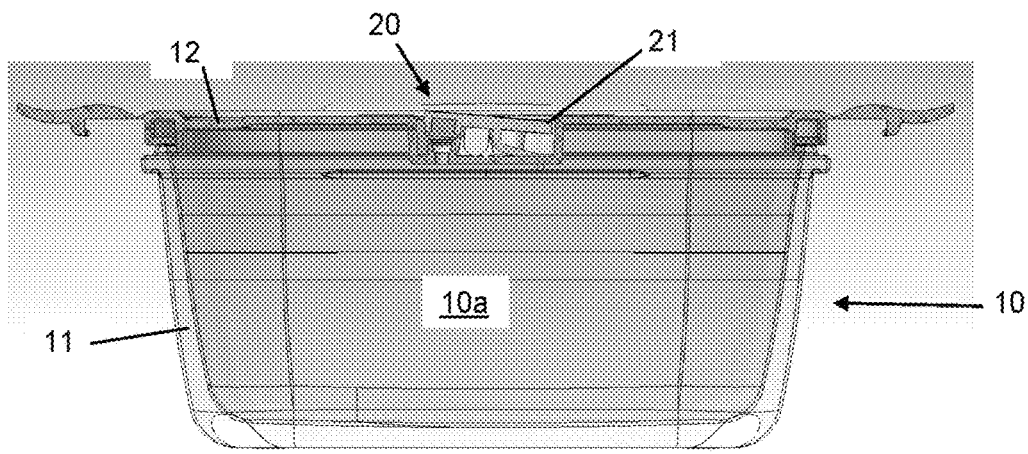
Figure 7:
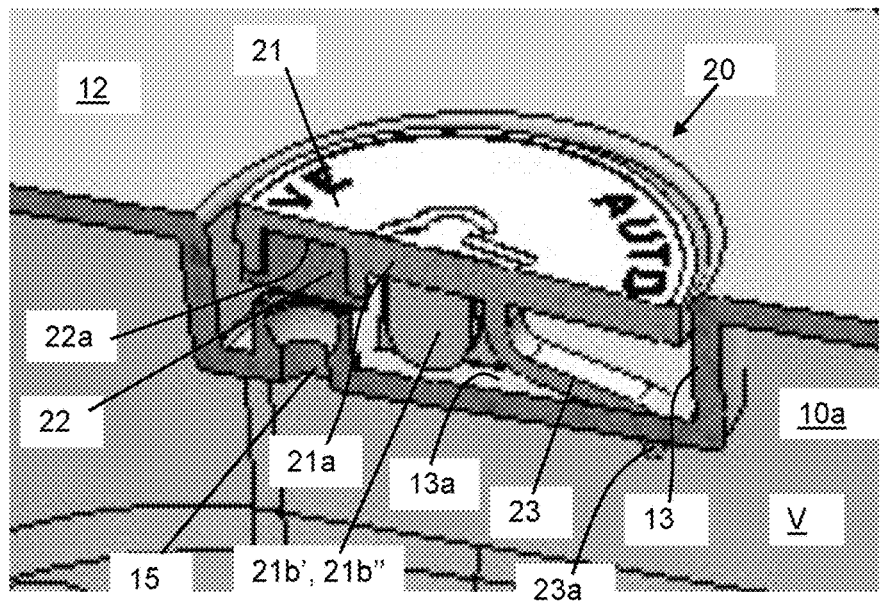

In detail, the container 10 comprises, as shown in FIGS. 1, 2 and 3:
a lower containment body, indicated with 11, in particular of glass, adapted to contain food and generally food products, indicated with C;
an upper cover or lid, designated by the reference numeral 12, in particular of plastic, adapted to hermetically couple with the lower containment body 11 and
an automatic valve device or valve, designated as a whole by the reference numeral 20, in the form of a plug or cap, integrated in the upper cover 12 of the container 10, wherein this automatic valve 20 has the specific function of allowing the venting and discharge to the outside of the steam V which is produced by heating and cooking, in particular but not exclusively in a microwave oven, of the food C and the food product contained in the same container 10, and is housed in a recess or niche 13 which is formed in a central region of the upper cover 12 and has a bottom 13a which has a through hole 15 in communication with the interior of the container 10.

According to a salient feature of the present invention, the automatic valve 20, integrated in the upper cover 12 of the container 10 and housed in the recess 13 formed in the same upper cover 12, has a special configuration comprising:

a control member 21, adapted to control the pressure P present and acting inside the container 10, and an elastic tongue or tab 23, associated with the control member 21.

The control member 21 in turn comprises:

a main body 21a, in particular disc-shaped, moulded with a suitable plastic material; and two projecting bodies 21b' and 21b", moulded in one piece together with the main body 21a and therefore with the same plastic material, extending downwardly from a central region of the main body 21a, wherein these two projecting bodies 21b' and 21b" have the function of rotationally connecting and thus pivoting the control member 21 on the bottom 13a of the recess 13 defined by the upper cover 12 of the container 10, so as to allow the control member 10 to rotate and tilt, remaining stably connected, with respect to the bottom 13a of the recess 13, as described in greater detail hereinafter by describing the operation of the automatic valve 20.

The elastic tongue 23 is also moulded integrally with the main body 21a, from which it extends, of the control member 21, therefore with the same plastic material, and has a deformed configuration, as shown in FIG. 3, with a free end 23a of the same elastic tongue 23 engaged with the bottom 13a of the recess 13 which houses the automatic valve 20, so as to apply on the control member 21, by effect of this deformed configuration, an elastic force, designated by F, oriented and directed in the direction of pressing the control member 21 against the through hole 15, formed in the bottom 13a of the recess 13, so as to close it, and consequently prevent the steam V produced by the heated food C in the microwave oven from coming out of the container 10.

In this way, as further described hereinafter, when the internal pressure P, acting inside the container 10, of the steam V produced by the progressive heating and cooking of the food C in the microwave oven, reaches a critical value P1 and therefore prevails over the elastic force F, determined by the elastic tongue 23, which presses and closes the control member 21 against the through hole 15 formed in the bottom 13a of the recess 13 defined by the upper cover 12 of the container 10, the control member 21 is automatically activated so as to rotate and tilt in contrast with the action of the elastic force F, as indicated by an arrow f1 in FIG. 3, F, making fulcrum through the two projecting bodies 21b' and 21b" rotationally connected to the bottom 13a, in order to open and detach the control member 21 from the through hole 15 formed in the bottom 13a of the recess 13, and therefore allow the steam V to exit from the container 10 and to flow out.

The control member 21 further comprises an occlusion element 22, in particular of rubber, which is housed in a respective seat 22a formed in the main body 21a of the control member 21, on the opposite side of the elastic tongue 23 with respect to the two projecting bodies 21b' and 21b" which act as fulcrum for the control member 21.

In particular, this occlusion element 22 is adapted to cooperate with the through hole 15, formed in the bottom 13a in which the automatic valve 20 is housed, in order to selectively close or open such through hole 15, when the control member 21 rotates and tilts in one direction or the other with respect to the bottom 13a of the recess 13, as better described below.

Figures 8A, 8B:
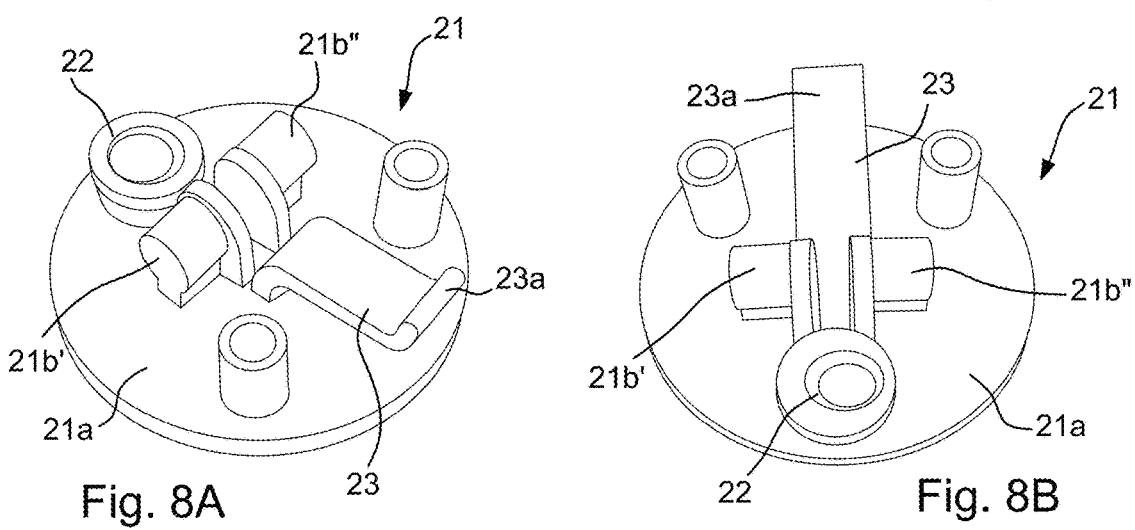
FIGS. 8A and 8B are photographic images of a control member, moulded with a suitable plastic material, which is an essential part of the automatic valve, integrated in the lid of the hermetic container of the invention, 8C is a further photographic image showing an exemplary material of the container according to the present invention.
Figure 8C:
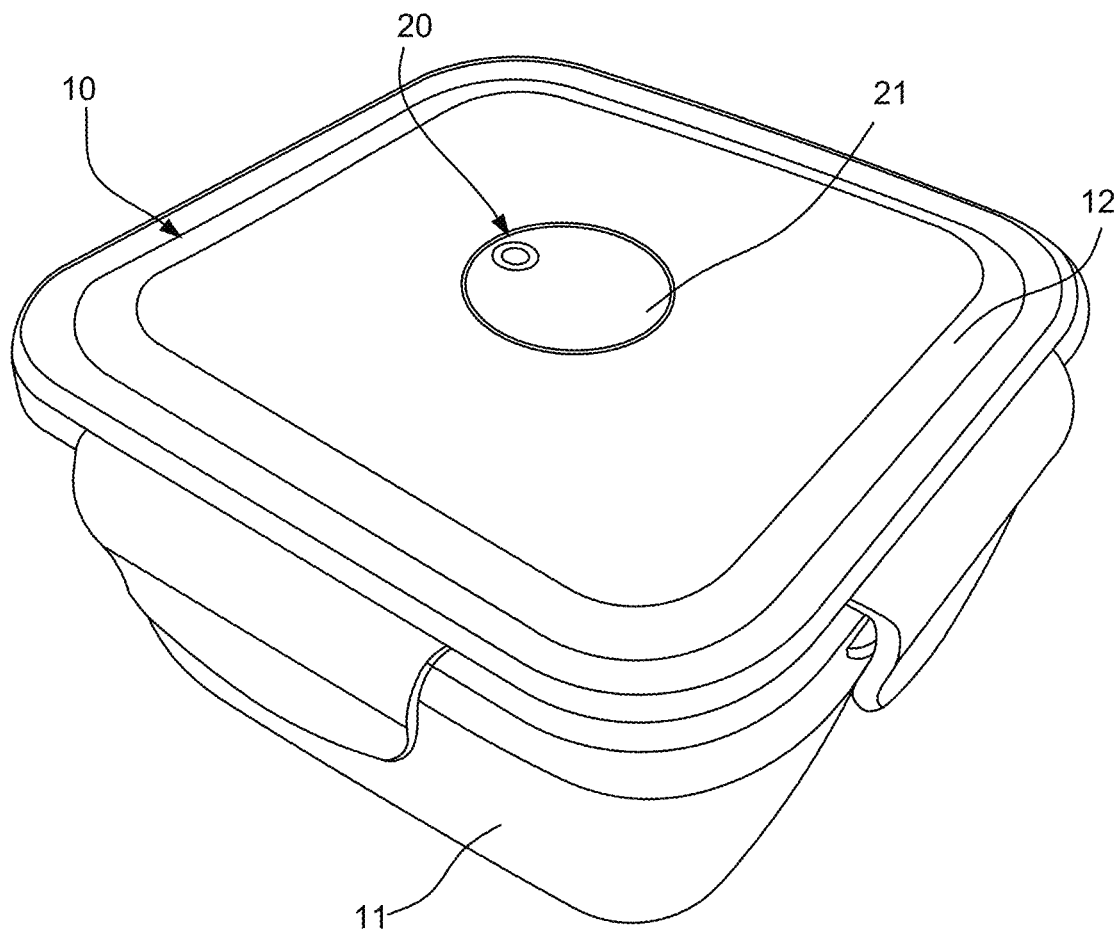
FIGS. 8D and 8E are further photographic images showing some details of the lid of the container of FIG. 8C and of the respective automatic valve.
Figure 8D:
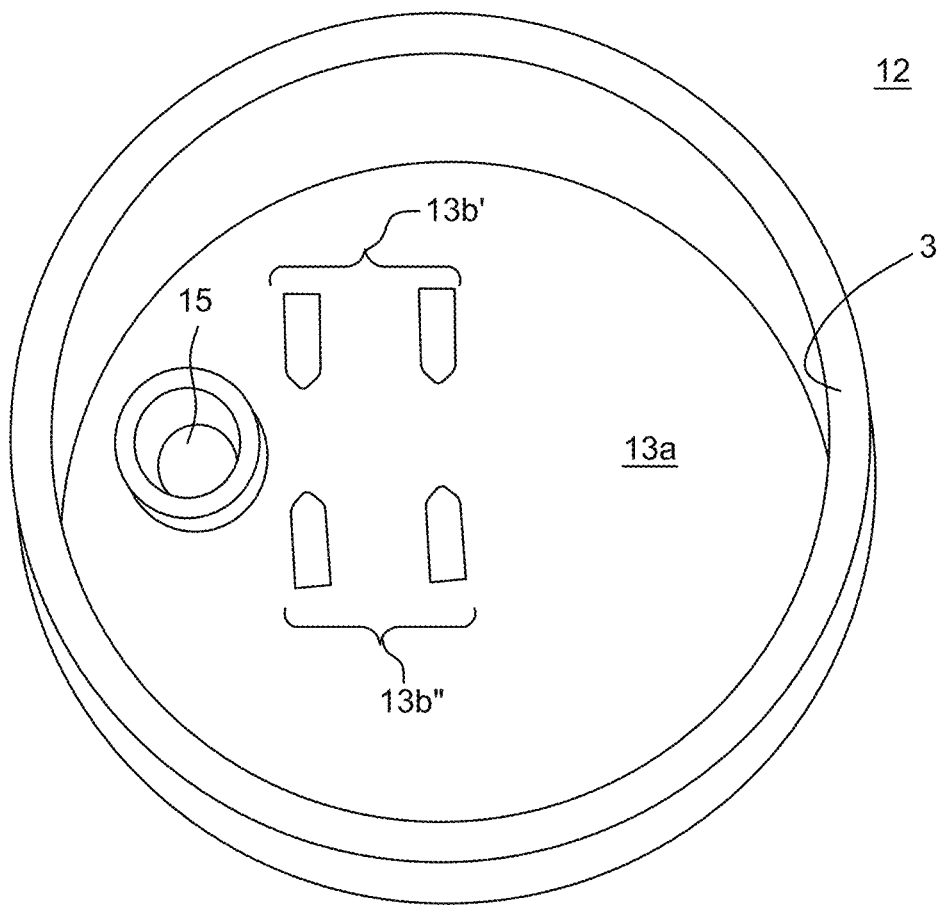

Moreover, the two projecting bodies 21b' and 21b", which extend from the main body 21a and have the function of connecting and pivoting the control member 21 on the bottom 13a of the recess 13, are inserted, in the area of their ends spaced from the main body 21a, in respective seats, designated by 13b' and 13b" and shown in FIG. 8D, wherein these seats 13b' and 13b" are formed in the same bottom 13a of the recess 13, of the upper cover 12, in which the automatic valve 20 is housed.

In particular these seats 13b' and 13b", formed in the bottom 13a of the recess 13, which house the ends of the two projecting bodies 21b' and 21b", are configured in such a way as to rotationally connect and therefore pivot, in a stable manner, the main body 21a of the control member 21 on the bottom 13a of the recess 13, i.e. so as to retain the main body 21a and therefore prevent the control member 21 from detaching from the bottom 13a, despite being subjected to various forces, such as the pressure of the steam V inside the container 10 and the elastic force F determined by the elastic deformation of the tab or tongue 23, which tend to detach it.

For example, as shown in FIG. 8D, these seats 13b' and 13b" are configured so as to receive, by elastically deforming, the ends of the two projecting bodies 21b' and 21b" and then snap elastically so as to retain these ends. once housed in the same seats 13b' and 13b".

For the sake of completeness of information, the photographic images of FIG. 8A-8E show a material example of the container according to the present invention, and some relevant details of such container, in particular concerning the respective automatic valve for venting the steam generated therein, as illustrated by the following table.

Figure 8E:
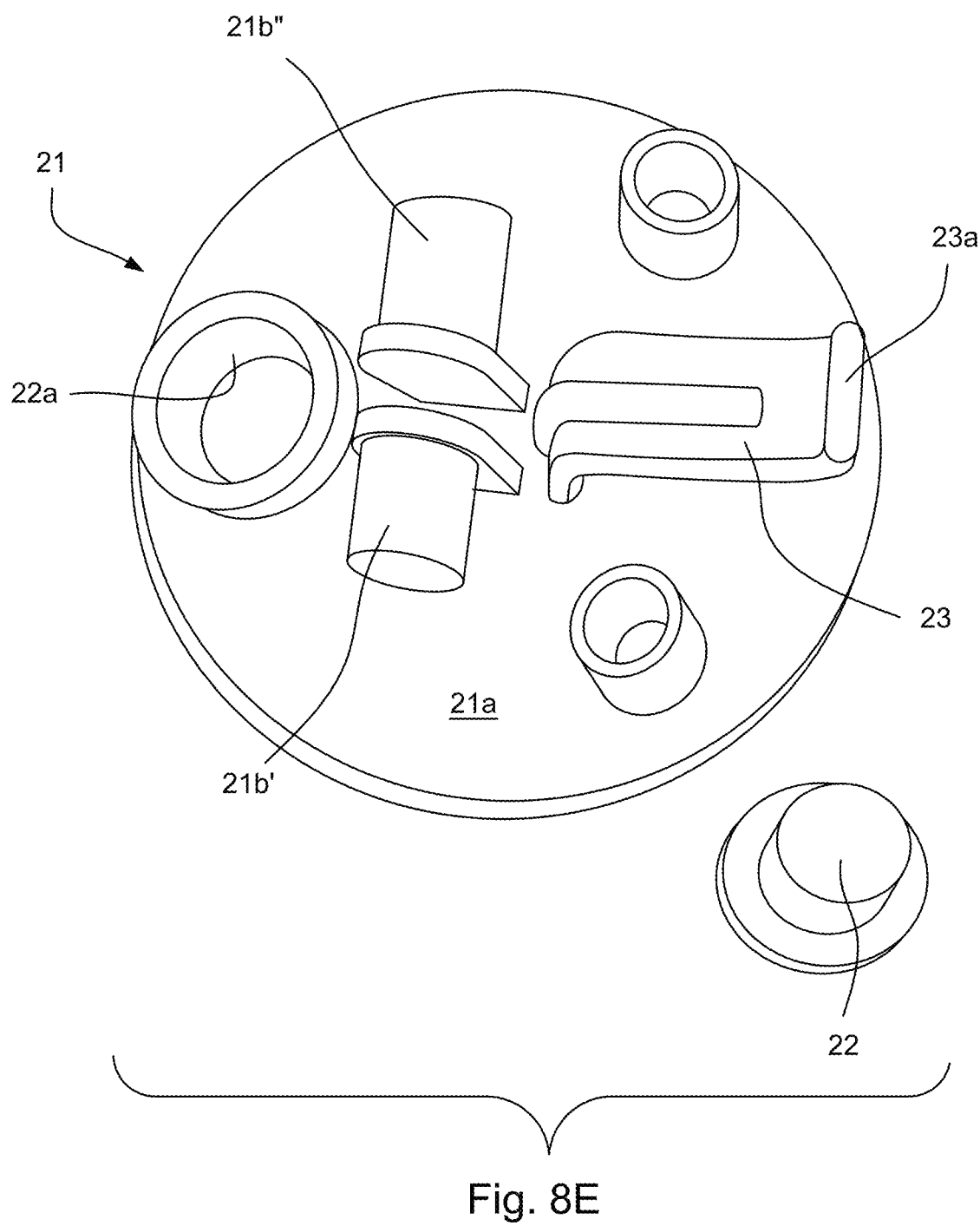

| Photographic image | Description |
| --- | --- |
| FIGS. 8A and 8B | Control element 21, moulded with a suitable plastic material, essential part of the automatic valve 20, integrated in the cover 12 of the hermetic container 10 of the invention, for venting the steam V. |
| FIG. 8C | Example of the hermetic container 10 of the invention. |
| FIG. 8D | Area of the cover 12 of the hermetic container 10 with the seat 13, in the form of a recess, which houses the automatic valve 20 for venting the steam V. |
| FIG. 8E | Control member 21 of the automatic valve 20. |

Operation of the Container of the Invention and of the Respective Automatic Valve for the Venting of the Steam Produced by the Heating of the Food Contained in the Same Container In use, the container 10 of the invention, after being initially filled with the food C or generally the food product to be heated, is introduced into the microwave oven.

Consequently the microwave oven heats the food C contained in the container 10, causing, by effect of this heating, the production of steam V inside the same container 10.

This heating with consequent production of steam V in turn causes a progressive increase in the pressure P present inside the container 10.

Therefore, when the internal pressure P, present inside the container 10, of the steam V produced by the heating and cooking of the food C in the microwave oven, reaches a critical value P1 such as to prevail over the elastic force F, determined by the elastic deformation of the elastic tongue 23, pressing and closing the control member 21 or the respective occlusion element 22 against the through hole 15 formed in the bottom 13a of the recess 13 defined by the upper cover 12 of the container 10, the control member 21 is automatically activated so as to rotate and tilt, as shown in FIG. 3 by an arrow f1, further deforming the elastic tongue 23 and pivoting on the two projecting bodies 21b' and 21b" which rotationally connect the control member 21 to the bottom 13a of the recess 13.

In this way, the occlusion element 22 opens and comes off from the through hole 15, formed in the bottom 13a of the recess 13, so as to allow the steam V to escape from the container 10 and to freely flow out.

Therefore, due to the venting of the vapour or steam V to the outside of the container 10, the pressure P of the steam V inside the same container decreases until it is again lower than the critical threshold P1.

As a result, the elastic force F, applied by the elastic tongue 23, returns again to prevail over the pressure P present inside the container 10, so as to cause the rotation, indicated in FIG. 3 by an arrow f2 in the opposite direction to that of the arrow f1, of the control member 21 with respect to the bottom 13a of the recess 13, with the two projecting bodies 21b' and 21b", which connect the control member 21 to such bottom 13a, operating as fulcrum for such rotation.

Also as a result of this rotation of the control member 21 in the direction indicated by the arrow f2, the elastic tongue 23 again assumes the previous deformed configuration.

In this way, the occlusion element 22 is automatically closed on the through hole 15 formed in the bottom 13a of the recess 13, with the consequent immediate stop of the venting of steam V to the outside of the container 10.

It is therefore clear, from what has been described, that the container 10 of the invention suitable for containing food or generally products to be heated, in particular in a microwave oven, fully achieves the intended objects and more specifically advantageously allows for the steam, which is produced by heating the food and the food product in the microwave oven, to vent and exit out, upon reaching a critical value of the vapour or steam pressure.

It follows that the container 10 has the capability both to heat and cook the food correctly, contained in the container 10, in the microwave oven, and to avoid that critical pressure values are exceeded inside the container, with the risk of creating conditions which could be potentially dangerous for the user of the container and of the microwave oven.

Variants and Further Embodiments of the Invention

Of course, without prejudice to the principle and basic technical concept of the container according to the present invention, and of the respective automatic valve for the venting of the steam which forms as a result of the heating of the food contained in the same container, it is clear that the respective embodiments can be subjected to variants, modifications and improvements with respect to what has been described and illustrated heretofore, without departing from the aim and scope of the invention itself.

For example, the elastic tongue 32, having a deformed configuration, can be replaced by alternative elastic means, such as in particular a metal spring, adapted, like the elastic tongue 32, to determine an elastic force directed to press the occlusion element 22 against the through hole 15 which is formed in the bottom 13a of the recess 13, so as to close it, and consequently also prevent the steam V produced by the food C, heated in the microwave oven, from escaping from the container 10.

Furthermore, the projecting bodies 21b' and 21b" which extend from the disc-shaped main body 21a of the control member 21 can be replaced by alternative connecting and pivoting means, suitable, similarly to such protruding bodies, To connect the control member 21 to the bottom 13a of 11/13 the recess 13, formed in the upper cover 12, which houses the automatic steam vent valve 20 V.

The invention claimed is:

1. A container for heating and cooking food, comprising:
 a lower containment body adapted to contain food and food products;
 an upper cover adapted to hermetically couple with the lower containment body; and
 an automatic valve, integrated in the upper cover of the container, suitable to allow the venting and discharge to the outside of the steam produced by heating and cooking the food contained in the same container;
 wherein said automatic valve in turn comprises:
 a control member, designed to control the pressure present inside the container; and
 elastic means associated with said control member;
 wherein said control member is housed in a recess, formed in the upper cover, which recess has a bottom with a through hole in communication with the inside of the container;
 wherein said control member is pivoting on and adapted to rotate and tilt with respect to the bottom of said recess; and
 wherein said elastic means are adapted to apply an elastic force directed to press and close said control member against said through hole formed in the bottom of the recess, and thereby prevent the steam produced by the food, heated in the microwave oven, from coming out of the container;
 whereby, when the internal pressure, acting inside the container, of the steam produced by heating and cooking the food reaches a value critical and therefore prevails over the elastic force, applied by said elastic means, which presses and closes the control member against the through hole formed in the bottom of the recess defined by the upper cover of the container, the control member is automatically activated so as to rotate and to tilt against the action of said elastic force, pivoting on the bottom of the recess, so as to open and detach itself from said through hole formed in the bottom of the recess, and therefore allow the steam to exit from the container and flow out.

2. The container according to claim 1, wherein said control member comprises a main body which is moulded with a suitable plastic material,
 wherein said elastic means, associated with said control member, consist of an elastic tongue which extends from said main body of the control member and is moulded as a single piece together with said main body and therefore with the same plastic material, and
 wherein said elastic tongue has a deformed configuration, with a free end of the elastic tongue engaged with the bottom of the recess, so as to apply, on the control member, due to the effect of said deformed configuration, said elastic force directed to press the control member against the through hole, formed in the bottom of the recess, so as to close the through hole.

3. The container according to claim 2, wherein said control member further comprises two projecting bodies, moulded as single piece with said main body and therefore with the same plastic material, which extend downwards from the main body and are connected in the lower part to the bottom of the recess defined by the upper cover of the container, said two projecting bodies being able to act as a fulcrum for the rotation and tilting in the two directions of the control member with respect to the bottom of the recess.

4. The container according to claim 3, wherein said control member further comprises an occlusion element housed in a respective seat formed in said main body, said occlusion element being able to cooperate with said through hole to close or open the through hole, when said control member rotates and tilts with respect to the bottom of said recess.

5. The container according to claim 4, wherein said main body, said elastic tongue, and said projecting bodies of said control member are moulded with the same plastic material so as to form a single piece.

6. The container according to claim 1, wherein said lower containment body is made of glass and said upper cover is made of plastic.

7. A valve device, in the form of a plug, suitable to be integrated in a container provided to contain food and food products to be heated, said valve device being adapted to allow automatic venting and discharge, to the outside of the container, of the steam produced by heating and cooking of the food and the food product contained in the same container, the valve device comprising:
a seat having a bottom portion defining a through hole;
a control member, housed in said seat, able to control the pressure inside the food container in which the valve device is integrated; and
elastic means associated with said control member;
wherein said control member is pivoting on and adapted to rotate and tilt with respect to the bottom portion of said seat; and
wherein said elastic means are able to apply an elastic force directed to press and close said control member against said through hole formed in the bottom portion of the seat, thereby preventing the steam, produced by the heated food, from coming out of the container in which the valve device is integrated;
whereby, when the pressure, inside the container in which the valve device is integrated, of the steam which is produced by heating and cooking of the food reaches a critical value and therefore prevails over the elastic force, applied by said elastic means, which presses and closes the control member against the through hole formed in the bottom portion of the seat, the control member is automatically activated so as to rotate and to tilt in contrast to the action of said elastic force, making fulcrum on the bottom portion of the seat, so as to open and detach said control member from said through hole formed in the bottom portion of the seat, and therefore allow the steam to exit from the container and to flow out.

8. The valve device according to claim 7, wherein said control member comprises a main body moulded with a suitable plastic material,
wherein said elastic means, associated with said control member, consist of an elastic tongue, which extends from said main body of the control member and is moulded as a single piece together with said main body and therefore with the same plastic material, and
wherein said elastic tongue exhibits a deformed configuration, with a free end of the elastic tongue engaged with the bottom portion of the seat, so as to apply, on the control member, because of said deformed configuration, said elastic force directed to press the control member against the through hole, formed in the bottom portion of the seat, so as to close the through hole.

9. The valve device according to claim 8, wherein said control member further comprises two protruding bodies, moulded in one piece with said main body and therefore with the same plastic material, which extend downwards from the main body and are connected in the lower part to the bottom portion of said seat, said two protruding bodies being able to operate as a fulcrum for the rotation and inclination of the control member with respect to the bottom portion of the seat.

10. The valve device according to claim 9, wherein said main body, said elastic tongue, and said protruding bodies of said control member are moulded with the same plastic material to form a single piece.

11. The container according to claim 2, wherein said control member further comprises an occlusion element housed in a respective seat formed in said main body, said occlusion element being able to cooperate with said through hole to close or open the through hole, when said control member rotates and tilts with respect to the bottom of said recess.

12. The container according to claim 3, wherein said main body, said elastic tongue, and said projecting bodies of said control member are moulded with the same plastic material so as to form a single piece.

13. The container according to claim 2, wherein said lower containment body is made of glass and said upper cover is made of plastic.

14. The container according to claim 3, wherein said lower containment body is made of glass and said upper cover is made of plastic.

15. The container according to claim 4, wherein said lower containment body is made of glass and said upper cover is made of plastic.

16. The container according to claim 5, wherein said lower containment body is made of glass and said upper cover is made of plastic.

17. The container according to claim 11, wherein said lower containment body is made of glass and said upper cover is made of plastic.

18. The container according to claim 12, wherein said lower containment body is made of glass and said upper cover is made of plastic.

* * * * *